United States Patent
Ouyang et al.

(10) Patent No.: US 9,804,777 B1
(45) Date of Patent: Oct. 31, 2017

(54) GESTURE-BASED TEXT SELECTION

(71) Applicant: Google Inc., Mountain View, CA (US)

(72) Inventors: Yu Ouyang, San Jose, CA (US); Shumin Zhai, Los Altos, CA (US)

(73) Assignee: Google Inc., Mountain View, CA (US)

( * ) Notice: Subject to any disclaimer, the term of this patent is extended or adjusted under 35 U.S.C. 154(b) by 461 days.

(21) Appl. No.: 13/943,745

(22) Filed: Jul. 16, 2013

Related U.S. Application Data

(60) Provisional application No. 61/717,505, filed on Oct. 23, 2012.

(51) Int. Cl.
G06F 3/14       (2006.01)
G06F 3/0489     (2013.01)

(52) U.S. Cl.
CPC .................. G06F 3/0489 (2013.01)

(58) Field of Classification Search
CPC ..................... G06F 3/14; G06F 3/17
USPC ......... 715/200–277, 700–867; 700/701–866;
709/201–229; 705/50–79; 345/30–111,
345/168, 173, 175, 473, 171;
340/825.72; 382/305; 348/65
See application file for complete search history.

(56) References Cited

U.S. PATENT DOCUMENTS

| | | | |
|---|---|---|---|
| 4,566,000 A | 1/1986 | Goldman et al. | |
| 5,327,161 A | 7/1994 | Logan et al. | |
| 5,523,775 A | 6/1996 | Capps | |
| 5,666,113 A | 9/1997 | Logan | |
| 5,880,411 A | 3/1999 | Gillespie et al. | |
| 5,903,229 A | 5/1999 | Kishi | |
| 6,286,064 B1 | 9/2001 | King et al. | |
| 6,292,179 B1 | 9/2001 | Lee | |
| 6,507,678 B2 * | 1/2003 | Yahagi | 382/305 |
| 6,704,034 B1 | 3/2004 | Rodriguez et al. | |

(Continued)

FOREIGN PATENT DOCUMENTS

| | | |
|---|---|---|
| EP | 2098947 A2 | 9/2009 |
| EP | 2407892 A1 | 1/2012 |
| WO | 2012166976 A2 | 12/2012 |

OTHER PUBLICATIONS

U.S. Appl. No. 60/430,338, by Daniel Suraqui, filed Nov. 29, 2002.

(Continued)

*Primary Examiner* — Ruay Ho
(74) *Attorney, Agent, or Firm* — Shumaker & Sieffert, P.A.

(57) ABSTRACT

An example method includes outputting a plurality of characters, receiving an input indicative of a slide gesture across one or more regions associated with a group of characters included in the plurality of characters, determining, based on an origination point and/or a speed of movement, whether the slide gesture represents a character string level selection or a character level selection, responsive to determining that the slide gesture represents the character string level selection, outputting a graphical selection of at least one character string included in the group of characters, such that the at least one character string is visually differentiated from any of the plurality of characters not included in the group of characters, and responsive to determining that the slide gesture represents the character level selection, outputting, in single character increments, a graphical selection of at least one character included in the group of characters.

18 Claims, 6 Drawing Sheets

(56) References Cited

U.S. PATENT DOCUMENTS

| | | | |
|---|---|---|---|
| 6,801,190 B1 | 10/2004 | Robinson et al. | |
| 6,891,551 B2 | 5/2005 | Keely et al. | |
| 7,030,863 B2 | 4/2006 | Longe et al. | |
| 7,032,171 B1 | 4/2006 | Carroll | |
| 7,042,443 B2 | 5/2006 | Woodard et al. | |
| 7,075,520 B2 | 7/2006 | Williams | |
| 7,088,345 B2 | 8/2006 | Robinson et al. | |
| 7,098,896 B2 | 8/2006 | Kushler et al. | |
| 7,145,554 B2 | 12/2006 | Bachmann | |
| 7,151,530 B2 | 12/2006 | Roeber et al. | |
| 7,199,786 B2 | 4/2007 | Suraqui | |
| 7,250,938 B2 | 7/2007 | Kirkland et al. | |
| 7,251,367 B2 | 7/2007 | Zhai | |
| 7,277,088 B2 | 10/2007 | Robinson et al. | |
| 7,453,439 B1 | 11/2008 | Kushler et al. | |
| 7,508,324 B2 | 3/2009 | Suraqui | |
| 7,571,393 B2 | 8/2009 | Premchandran et al. | |
| 7,659,887 B2 | 2/2010 | Larsen et al. | |
| 7,683,889 B2 | 3/2010 | Rimas Ribikauskas et al. | |
| 7,706,616 B2 | 4/2010 | Kristensson et al. | |
| 7,716,579 B2 | 5/2010 | Gunn et al. | |
| 7,737,956 B2 | 6/2010 | Hsieh et al. | |
| 7,737,959 B2 | 6/2010 | Gruhlke et al. | |
| 7,750,891 B2 | 7/2010 | Stephanick et al. | |
| 7,877,685 B2 | 1/2011 | Peters | |
| 7,921,361 B2 | 4/2011 | Gunn et al. | |
| 8,036,878 B2 | 10/2011 | Assadollahi | |
| 8,042,044 B2 | 10/2011 | Van Leeuwen | |
| 8,098,896 B2 | 1/2012 | Isomura et al. | |
| 8,135,582 B2 | 3/2012 | Suraqui | |
| 8,276,099 B2 | 9/2012 | Yost | |
| 8,356,059 B2 | 1/2013 | Wiljanen et al. | |
| 8,365,059 B2 | 1/2013 | Walsh et al. | |
| 8,482,521 B2 | 7/2013 | Abe et al. | |
| 8,656,296 B1 | 2/2014 | Ouyang et al. | |
| 8,656,315 B2 | 2/2014 | Kirkpatrick | |
| 8,826,190 B2 | 9/2014 | Kirkpatrick | |
| 2003/0068088 A1 | 4/2003 | Janakiraman et al. | |
| 2003/0234766 A1 | 12/2003 | Hildebrand | |
| 2005/0076300 A1 | 4/2005 | Martinez | |
| 2005/0134578 A1 | 6/2005 | Chambers et al. | |
| 2006/0005151 A1 | 1/2006 | Altman | |
| 2006/0026535 A1 | 2/2006 | Hotelling et al. | |
| 2006/0048071 A1 | 3/2006 | Jarrett et al. | |
| 2006/0061557 A1 | 3/2006 | Kyrola | |
| 2006/0119582 A1 | 6/2006 | Ng et al. | |
| 2006/0176283 A1 | 8/2006 | Suraqui | |
| 2006/0187216 A1 | 8/2006 | Trent et al. | |
| 2007/0009070 A1 | 1/2007 | Lo et al. | |
| 2007/0091070 A1 | 4/2007 | Larsen et al. | |
| 2007/0157085 A1 | 7/2007 | Peters | |
| 2007/0236475 A1 | 10/2007 | Wherry | |
| 2007/0260981 A1 | 11/2007 | Kim et al. | |
| 2007/0273664 A1 | 11/2007 | Kim et al. | |
| 2008/0016467 A1 | 1/2008 | Chambers et al. | |
| 2008/0062136 A1* | 3/2008 | Nakamura et al. | 345/171 |
| 2008/0079604 A1* | 4/2008 | Madonna et al. | 340/825.72 |
| 2008/0165142 A1 | 7/2008 | Kocienda et al. | |
| 2008/0307350 A1 | 12/2008 | Sabatelli et al. | |
| 2008/0316183 A1 | 12/2008 | Westerman et al. | |
| 2009/0058823 A1 | 3/2009 | Kocienda | |
| 2009/0064045 A1 | 3/2009 | Tremblay | |
| 2009/0109182 A1 | 4/2009 | Fyke et al. | |
| 2009/0178008 A1 | 7/2009 | Herz et al. | |
| 2009/0189862 A1 | 7/2009 | Viberg | |
| 2009/0213134 A1 | 8/2009 | Stephanick et al. | |
| 2009/0228792 A1 | 9/2009 | van Os et al. | |
| 2009/0228842 A1 | 9/2009 | Westerman et al. | |
| 2009/0268018 A1* | 10/2009 | Kasai | 348/65 |
| 2010/0013852 A1 | 1/2010 | Liu | |
| 2010/0123724 A1* | 5/2010 | Moore et al. | 345/473 |
| 2010/0134425 A1 | 6/2010 | Storrusten | |
| 2010/0153879 A1 | 6/2010 | Rimas-Ribikauskas et al. | |
| 2010/0214237 A1 | 8/2010 | Echeverri et al. | |
| 2010/0235726 A1 | 9/2010 | Ording et al. | |
| 2010/0235778 A1 | 9/2010 | Kocienda et al. | |
| 2010/0235783 A1 | 9/2010 | Ording et al. | |
| 2010/0238138 A1* | 9/2010 | Goertz et al. | 345/175 |
| 2010/0273379 A1 | 10/2010 | Chen et al. | |
| 2010/0287486 A1 | 11/2010 | Coddington | |
| 2010/0293460 A1* | 11/2010 | Budelli | 715/702 |
| 2011/0083105 A1 | 4/2011 | Shin et al. | |
| 2011/0090151 A1* | 4/2011 | Huang et al. | 345/168 |
| 2011/0134068 A1* | 6/2011 | Shimoni | 345/173 |
| 2011/0193788 A1 | 8/2011 | King et al. | |
| 2011/0231789 A1 | 9/2011 | Bukurak et al. | |
| 2011/0239110 A1 | 9/2011 | Garrett et al. | |
| 2011/0239153 A1 | 9/2011 | Carter et al. | |
| 2011/0273379 A1 | 11/2011 | Chen et al. | |
| 2011/0314414 A1 | 12/2011 | Stringer et al. | |
| 2011/0320978 A1 | 12/2011 | Horodezky et al. | |
| 2012/0013541 A1 | 1/2012 | Boka et al. | |
| 2012/0036469 A1 | 2/2012 | Suraqui | |
| 2012/0139844 A1 | 6/2012 | Ramstein et al. | |
| 2012/0185787 A1 | 7/2012 | Lisse et al. | |
| 2012/0192117 A1 | 7/2012 | Migos et al. | |
| 2012/0268387 A1 | 10/2012 | Kuo et al. | |
| 2012/0293427 A1* | 11/2012 | Mukai et al. | 345/173 |
| 2012/0306772 A1 | 12/2012 | Tan et al. | |
| 2012/0311437 A1 | 12/2012 | Weeldreyer et al. | |
| 2013/0002719 A1 | 1/2013 | Ide | |
| 2013/0024820 A1 | 1/2013 | Kirkpatrick | |
| 2013/0036388 A1 | 2/2013 | Kirkpatrick | |
| 2013/0042199 A1 | 2/2013 | Fong et al. | |
| 2013/0283208 A1* | 10/2013 | Bychkov et al. | 715/810 |
| 2014/0109016 A1 | 4/2014 | Ouyang et al. | |

OTHER PUBLICATIONS

U.S. Appl. No. 60/505,724, by Daniel Suraqui, filed Sep. 22, 2003.

U.S. Appl. No. By 13/747,214, by Yu Ouyang, filed Jan. 22, 2013.

"An Introduction to Writing Systems & Unicode," retrieved from http://rishida.net/docs/unicode-tutorial/toc, accessed on May 15, 2012, 20 pp.

"Accesibility Solution s for iPhone," retrieved from http://www.apple.com/accessibility/iphone/hearing.html, accessed on Aug. 16, 2012, 4 pp.

Williams, "How to highlight, cut, copy and past using a BlackBerry Z10 smartphone," retrieved from http://helpblog.blackberry.com/2013/04/blackberry-z10-text-edit/, Apr. 10, 2013, 3 pp.

Neo, "Select, copy and past text on Android the easy way," retrieved from http://74.55.73.196/~shanzai/index.php/guides.html?start=225, Oct. 14, 2010, 3 pp.

"BlackBerry Bold 9700 Smartphone 5.0 User Guide, Typing Shortcuts," retrieved from www.blackberry.com/docs/smartphones, accessed on May 16, 2012, 1 p.

"BlackBerry Bold 9700 Smartphone 5.0 User Guide, Typing Shortcuts," retrieved from www.blackberry.com/docs/smartphones, accessed on May 17, 2011, 327 pp.

"BlackBerry Torch 9800 Smartphone Version 6.0," User Guide, retrieved from www.blackberry.com/docs/smartphones, accessed on Jan. 19, 2011, 302 pp.

"BlackBerry Torch 9800 Smartphone Version 6.0," User Guide, retrieved from www.blackberry.com/docs/smartphones, accessed on May 27, 2011, 15 pp.

U.S. Appl. No. 13/836,242, by Yu Ouyang, filed Mar. 15, 2013.

Natasha Lomas, "Hey Apple, What the Next iPhone Really, Really Needs Is a Much Better Keyboard," http://techcrunch.com/2013/04/21/the-iphone-keyboard-stinks/?, Apr. 21, 2013, 6 pgs.

Ahmad et al., "A Keystroke and Pointer Control Input Interface for Wearable Computers" 2006, IEEE, 10 pp.

De Silva et al., "Human Factors Evaluation of a Vision-Based Facial Gesture Interface," 2003, IEEE, 8 pp.

U.S. Appl. No. 13/117,924, by Ficus Kirkpatrick, filed May 27, 2011.

U.S. Appl. No. 13/250,675, by Ficus Kirkpatrick, filed Sep. 30, 2011.

Prosecution history from U.S. Appl. No. 13/117,924 from Nov. 10, 2011 through Oct. 15, 2012, 62 pp.

(56) References Cited

OTHER PUBLICATIONS

Prosecution history from U.S. Appl. No. 13/250,675 from Nov. 10, 2011 through Aug. 7, 2013, 83 pp.
"iPhone text entry," accessed on Aug. 2, 2012, 4 pp.
Milota et al., "Multimodal Interface with Voice and Gesture Input," IEEE International Conference on Systems, Man and Cybernetics, Intelligent Systems for the 21st Century, vol. 3, Oct. 22-25, 1995, 6 pp.
Shen et al., "Toward Gesture-Based behavior Authoring," Computer Graphics International 2005, IEEE, Jun. 22-24, 2005, 7 pp.
Notice of Allowance from U.S. Appl. No. 13/117,924, dated May 12, 2014, 16 pp.
Notice of Allowance from U.S. Appl. No. 13/250,675, dated Nov. 19, 2013, 11 pp.
Notice of Allowance from U.S. Appl. No. 13/250,675, dated Dec. 5, 2013, 6 pp.
Velazco, "Editing Text on Your iPad? Speed Up the Process With SwipSelection," retrieved from: https://techcrunch.com/2012/05/06/editing-text-on-your-ipad-speed-up-the-process-with-swipeselection/, May 6, 2012, 6 pp.
Albinsson et al., "High Precision Touch Screen Interaction," Paper: Input Interaction, Ft. Lauderdale, Florida, USA, Apr. 5-10, 2003, pp.
Zhai et al., "ShapeWriter on the iPhone—From the Laboratory to the Real World," Design Methods & Practice—Designing for Expression, Boston, MA, USA, Apr. 4-9, 2009, 4 pp.

* cited by examiner

GESTURE-BASED TEXT SELECTION

This application claims the benefit of U.S. Provisional Application No. 61/717,505, filed Oct. 23, 2012, the entire content of which is incorporated herein in its entirety.

BACKGROUND

Some computing devices (e.g., mobile phones, tablet computers, etc.) may provide a graphical keyboard as part of a graphical user interface for composing text (e.g., using a presence-sensitive input device and/or display, such as a touchscreen). The graphical keyboard may enable a user of the computing device to enter text (e.g., an e-mail, a text message, or a document, etc.). For instance, a presence-sensitive display of a computing device may output a graphical (or "soft") keyboard that enables the user to enter data by indicating (e.g., by tapping) keys displayed at the presence-sensitive display.

In some cases, the computing device may present a continuous-gesture graphical keyboard (sometimes referred to as a "gesture keyboard" or "combo gesture keyboard") with which a user can interact by sliding his or her finger over regions of the presence-sensitive display that are associated with keys of the graphical keyboard, thereby essentially gesturing a word to be input to the computing device. In other words, the user may input an entire word in a single gesture by tracing over the letters of the word output at a presence-sensitive display. In this way, continuous-gesture graphical keyboards provide an input method that allows the user to enter a word or group of words with a gesture. As such, a continuous-gesture graphical keyboard may allow the user to achieve a certain degree of efficiency, especially compared to one-handed tapping of a presence-sensitive screen (e.g., a presence-sensitive screen operatively coupled to or integrated with a computing device).

However, some continuous-gesture graphical keyboards and their associated text displays cause certain drawbacks. For example, when a user performs a gesture on a presence-sensitive display to select text that is displayed, the computing device may reflect an inaccurate text selection, due to the size of the presence-sensitive input device and the so-called "fat finger" problem. In different scenarios, a user may wish to utilize different levels of selection granularity, as pertains to individual letters, entire words, entire lines, or other increments of text to be selected. Thus, various drawbacks of gesture keyboards may reduce the accuracy with which a user may select text output by a computing device.

SUMMARY

In one example, a method includes outputting, by a computing device and for display, a plurality of characters, receiving, by the computing device, an input indicative of a slide gesture across one or more regions of a presence-sensitive input device, the one or more regions being associated with a group of characters included in the plurality of characters, and determining, by the computing device, whether the slide gesture represents a character string-level selection or a character-level selection from the group of characters, wherein the character string-level selection comprises a multi-character selection of a character string from the group of characters, and wherein the determining is based at least in part on one or more of an origination point, a direction of movement, and a speed of movement associated with the slide gesture across the one or more regions of the presence-sensitive input device. The method may further include responsive to determining that the slide gesture represents the character string-level selection from the group of characters, outputting, for display, a graphical selection of at least one character string included in the group of characters, such that the at least one selected character string is visually differentiated from any of the plurality of characters not included in the group of characters, and responsive to determining that the slide gesture represents the character-level selection from the group of characters, outputting, for display, a graphical selection of at least one character included in the group of characters, such that the at least one selected character is visually differentiated from any of the plurality of characters not included in the group of characters.

In another example, a device includes a memory and one or more programmable processors configured to output, for display, a plurality of characters, receive an input indicative of a slide gesture across one or more regions of a presence-sensitive input device that are associated with a group of characters included in the plurality of characters, and determine whether the slide gesture represents a character string-level selection or a character-level selection from the group of characters, wherein the character string-level selection comprises a multi-character selection of a character string from the group of characters, and wherein, to determine whether the slice gesture represents the character string-level selection, the one or more programmable processors are configured to determine one or more of an origination point, a direction of movement, and a speed of movement associated with the slide gesture across the one or more regions of the presence-sensitive input device. The programmable processor(s) may further be configured to responsive to determining that the slide gesture represents the character string-level selection from the group of characters, output for display, a graphical selection of at least one character string included in the group of characters, such that the at least one selected character string is visually differentiated from any of the plurality of characters not included in the group of characters, and responsive to determining that the slide gesture represents the character-level selection from the group of characters, output for display, a graphical selection of at least one character included in the group of characters, such that the at least one selected character is visually differentiated from any of the plurality of characters not included in the group of characters.

In another example, a computer-readable storage device is encoded with instructions, that, when executed, cause one or more programmable processors to perform operations that include outputting, for display, a plurality of characters, receiving an input indicative of a slide gesture across one or more regions of a presence-sensitive input device that are associated with a group of characters included in the plurality of characters, and determining whether the slide gesture represents a character string-level selection or a character-level selection from the group of characters, wherein the character string-level selection comprises a multi-character selection of a character string from the group of characters without incrementally selecting any individual characters included in the character string, and wherein the determining is based at least in part on one or more of an origination point, a direction of movement, and a speed of movement associated with the slide gesture across the one or more regions of the presence-sensitive input device. The operations may further include responsive to determining that the slide gesture represents the character string-level selection from the group of characters, outputting for display, a graphical selection of at least one character string, the at least one character string being included in the group of characters and demarcated from remaining characters of the plurality of characters by one or more space characters, such that the at least one selected character string is visually differentiated from the remaining characters of the plurality of characters by one or more space characters that are not included in the group of characters, and responsive to determining that the slide gesture represents the character-level selection from the group of characters, outputting for display, a graphical selection of at least one character included in the group of characters, such that the at least one selected character is visually differentiated from any of the plurality of characters not included in the group of characters.

The details of one or more examples in accordance with this disclosure are set forth in the accompanying drawings and the description below. Other features, objects, and advantages of this disclosure will be apparent from the description and drawings, and from the claims.

DETAILED DESCRIPTION

Figure 1A:
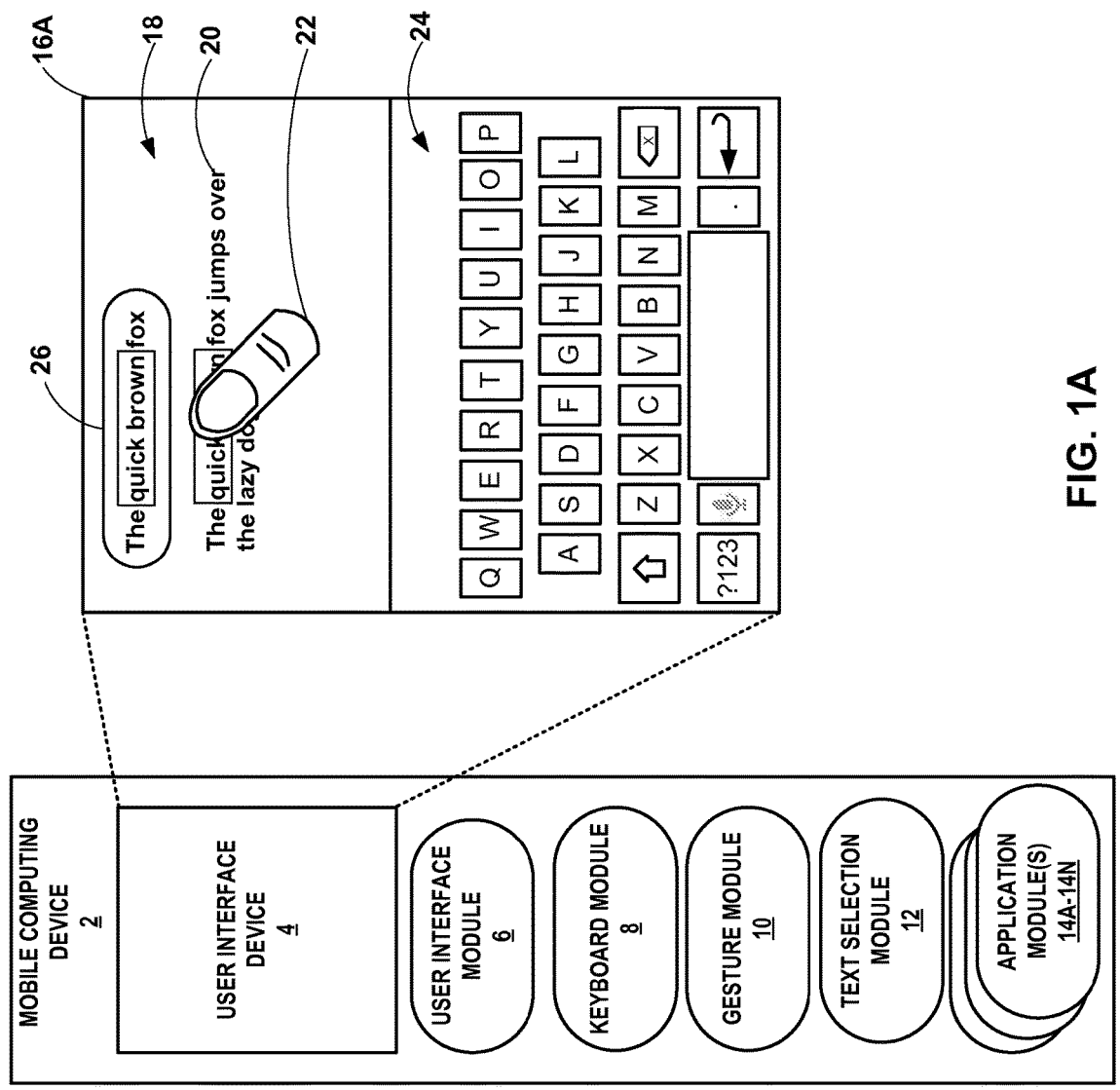
FIGS. 1A-1B are conceptual diagrams illustrating user interfaces (UI's) that a computing device may provide in implementing character string-level and character-level text selection, in accordance with one or more aspects of this disclosure.

A mobile computing device, such as a smartphone or tablet computer, may output a graphical user interface (GUI) for display at an output device or a user interface device. In turn, an input device, such as a presence-sensitive input device, may be configured or operable to detect the presence of an input object (e.g., a finger or stylus) when the input object is sufficiently close to the user interface device. In examples where the mobile computing device is equipped with a presence-sensitive input device, such as a touchscreen (which may also serve as an output display), the presence-sensitive input device may be configured to detect physical contact of the input object.

In some implementations of the disclosed technology, the GUI may include various types of user interface (UI) elements, such as icons, images, and text. As one example, the GUI may be associated with an application (such as a web browser application) executing on the mobile computing device. Through the web browser, a user may access text provided at various websites. As another example, the GUI may be associated with an input method editor (IME), through which a user may input textual content (e.g., as part of an email or text message). In some instances, the user may wish to use the device to select certain portions of the text in order to perform some operation on the selected portions of text. For instance, the user may wish to use the device to select a portion of the text in order to copy, cut, delete, enlarge, modify the font or style of, highlight, change the color of, underline, italicize, or perform some other operation on the selected portion of text.

In some examples, the text may include several distinct character strings (such as words and/or numbers). Each character sting may include a series of various types of characters, such as alphanumeric characters (letters and/or digits), special characters (such as symbols commonly used as punctuation marks or mathematical operators), space characters, and various others. In various scenarios, the user may wish to select text in increments of single characters (e.g., portions of strings), or in increments of entire strings (e.g., on a word-by-word basis).

Techniques of this disclosure are generally directed to delineating between providing character string-level and individual character-level selection functionalities at a computing device. For example, a mobile computing device implementing one or more of the techniques may detect various characteristics, such as a speed and/or origination point, of a swipe or slide gesture performed by a user at a presence-sensitive input device. In turn, the computing device may use the detected characteristics to determine whether the user is attempting to provide a character string-level selection or a character-level selection, and may incrementally select portions of the text accordingly. More specifically, for purposes of this disclosure, a character string-level selection may be associated with multi-character selections (e.g., selection in increments of distinct strings) without incremental selection of any individual characters included in the string(s). It will be appreciated that, in some scenarios, a character string (e.g., demarcated from other strings by space characters) may be a single-character string. In such scenarios, a character string-level selection may include an incremental selection of a single character.

Additionally, the mobile computing device may implement the techniques to provide hybrid selection capability, such as by enabling a user to "fine tune" a string-level selection by adding or removing particular single characters. As another example of the hybrid selection capability, the mobile computing device may enable a user to switch between character string-level and character-level selection by changing characteristics of the gesture (e.g., by slowing down the gesture or by changing a direction of the gesture).

The techniques described herein may provide one or more potential advantages. As one example, a mobile device implementing the techniques may enable a user to efficiently select blocks of text using character string-level selection (e.g., by starting the selection gesture at a space character positioned between distinct character strings, or by performing a relatively fast slide gesture). Furthermore, the mobile device may enable the user to more accurately select text using character-level selection (e.g., by starting the selection within a character string, or by performing a relatively slow slide gesture). Additionally, the user may avail of potentially greater efficiency as well as potentially greater precision in text selection, based on the hybrid selection capabilities listed above. The user may also use the device to perform character string-level and character-level text selections by varying characteristics of the slide gesture instead of double-tapping at precise locations of a presence-sensitive input device, in some cases.

Figure 1B:
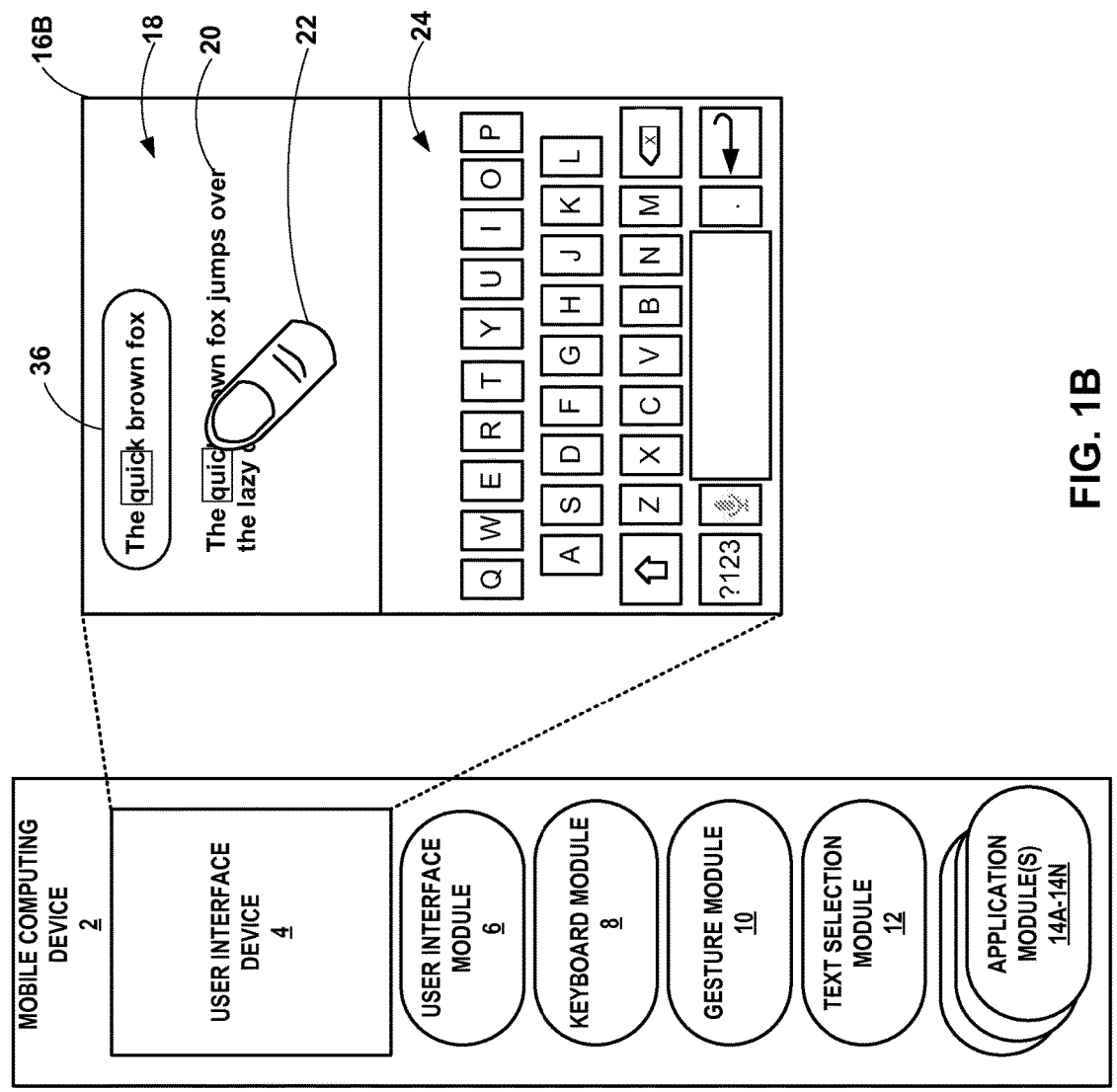

FIGS. 1A-1B are conceptual diagrams illustrating user interfaces (UIs) 16A-16B that mobile computing device 2 may provide in implementing character string-level and character-level text selection, in accordance with one or more aspects of this disclosure. Mobile computing device 2 may include, be, or be part of one or more of a variety of types of devices including mobile phones (such as "smartphones"), personal digital assistants (PDAs), tablet computers, convertible laptop/tablet computers, watches, and various others. As shown in the non-limiting examples of FIGS. 1A and 1B, various elements are shown as being included, stored, or otherwise implemented in mobile computing device 2. In some examples, however, one or more of these elements may be included, stored, or otherwise implemented in one or more devices that are separate and distinct from mobile computing device 2. In these examples, the one or more devices that are separate and distinct from mobile computing device 2 are coupled (physically, communicatively, and/or operatively) to mobile computing device 2.

FIG. 1A illustrates UI 16A in a scenario in which mobile computing device 2 is used for a character string-level text selection. As shown in FIG. 1A, mobile computing device 2 may include user interface (UI) device 4, user interface (UI) module 6, keyboard module 8, gesture module 10, text selection module 12, and one or more application modules 14A-14N. In various examples, UI device 4 may include a presence-sensitive input device. UI device 4 may include, be, or be part of several types of output devices and/or input/output capable devices, such as a presence-sensitive display (e.g., touchscreen). Examples of touchscreens known in the art include resistive touchscreens, capacitive touchscreens, optical touchscreens, and various others. In various examples where UI device 4 includes a touchscreen, UI device 4 may be configured or otherwise operable to receive user input via contact by an input object, such as a stylus or a user's finger. In certain implementations where UI device 4 includes a presence-sensitive display without a touchscreen, UI device 4 may not require physical contact to receive input. Instead, in such implementations, the presence-sensitive display of UI device 4 may recognize and receive user input based on a proximity of the input object (e.g., using physical criteria such as capacitance, or using inductive, and/or optical detection at or near the presence sensitive display). Additionally, UI device 4 is one non-limiting example of a presence-sensitive input device, which may or may not, in various implementations, incorporate output capabilities. In this manner, UI device 4 may enable mobile computing device 2 to detect user input in a variety of ways.

Application modules 14 may be configured or otherwise operable to perform operations based on various stimuli, such as user input. As one example, one or more of application modules 14 may utilize keyboard module 8 to output keyboard 24 in certain scenarios, such as activation of a text-entry element of UI 16A. In turn, the relevant application module(s) 14 may receive user input, and generate output based on the user input. Additionally, application modules 14 may communicate the output to a user through various facilities provided by mobile computing device 2, such as by causing UI module 6 to display the output in a readable format via UI device 4 (e.g., within GUI 16A). Application module(s) 14 may, in various instances, implement functionalities provided by a manufacturer of mobile computing device 2 and/or functionalities provided by another party (often referred to as "third party applications").

In various implementations, UI module 6 may enable mobile computing device 2 to output, for display at UI device 4, graphical user interface (GUI) 16A. As shown, GUI 16A may include various elements placed in various regions or areas of GUI 16A. Examples include text entry area 18, text block 20, virtual keyboard 24, and selection preview 26.

As shown in FIG. 1A, mobile computing device 2 may also include keyboard module 8. Keyboard module 8 may be configured or otherwise operable to generate virtual keyboard 24, and cause UI module 6 to output virtual keyboard 24 for display at UI device 4. In the example of FIG. 1A, virtual keyboard 24 generated by keyboard module 8 includes a standard QWERTY keyboard, which resembles a key layout of traditional keyboards. In other implementations, keyboard module 8 may generate one or more alternate keyboards to accommodate input of special characters (such as punctuation and mathematical operators), textual input corresponding to various languages and/or scripts, efficient keyboards that combine two or more characters into a single key, and others.

Gesture module 10 may be configured or otherwise operable to receive indications of gestures performed at input (or input/output) devices, such as at UI device 4. For instance, gesture module 10 may receive indications of tap or swipe gestures performed at one or more virtual keys of virtual keyboard 24, as detected by UI device 4. Responsive to the detected tap and/or swipe gestures performed at virtual keyboard 24, gesture module 10 may cause one or more components of mobile computing device 2 to record text input. Similarly, gesture module 10 may receive indications of tap and/or slide gestures that a user performs in order to select portions of text displayed within GUI 16A.

Additionally, gesture module 10 may implement one or more techniques of this disclosure to distinguish between character string-level and character-level selections. In turn, gesture module 10 may cause text selection module 12 to select specific portions of text displayed within GUI 16A. FIG. 1A illustrates a scenario in which gesture module 10 detects a character string-level selection. Gesture module 10 may detect the character string-level selection based on one or more of a number of criteria.

As one example, gesture module 10 may detect an origination point of a slide gesture performed with finger 22. If the origination point is positioned between two distinct character strings (e.g., between the words "The" and "quick" in text block 20), gesture module 10 may detect that the slide gesture corresponds to a character string-level selection. Similarly, if a speed of the slide gesture exceeds a threshold speed, gesture module 10 may detect that the slide gesture corresponds to a character string-level selection. As another example, gesture module 10 may use a direction of the slide gesture to detect that the slide gesture corresponds to a character string-level selection. For instance, if the slide gesture is substantially horizontal (e.g., parallel to a width edge of UI device 4), gesture module 10 may detect a character string-level selection. In contrast, if the slide gesture is substantially vertical (e.g., parallel to a height edge of UI device 4), gesture module 10 detect that the slide gesture corresponds to a scroll or other action requested by a user. In this manner, gesture module 10 may use any of a variety of characteristics of the slide gesture detected by UI device 4 to determine whether the slide gesture is associated with a text selection request, and if so, whether the text selection request is a character string-level selection.

FIG. 1A illustrates an example implementation in which text selection module 12 causes UI module 6 to display, as part of GUI 16A, selection preview 26. Text selection module 12 may cause UI module 6 to display selection preview 26 in order to provide a user with a view of text (selected or otherwise) that may be visually obstructed by finger 22. In many scenarios, finger 22 (or other input objects) may obstruct a user's view of text being selected, as well as text that surrounds the selected text. Text that is visually obstructed by finger 22 may be referred to herein as "occluded text." In the context of mobile computing devices that include touchscreens or other presence-sensitive displays, the inability of a user to provide precise input or to see GUI elements owing to the small size of the display is sometimes referred to colloquially as the "fat finger problem."

Text selection module 12 may generate selection preview 26 to include varying amounts of text. In the example of FIG. 1A, text selection module 12 generates selection preview 26 to include the selected text (namely, the words "quick brown") as well as one character string positioned on either side of the selected text within text block 20 (namely, the word "The" positioned to the left of the selected text, and the word "fox" positioned to the right of the selected text). In other examples, text selection module 12 may generate selection preview 26 to include varying amounts of texts, such as full lines of text block 20 that include the selected text, only the occluded text as detected by UI device 4, and only the selected text, among others. By generating and displaying selection preview 26, text selection module 12 may enable a user to view occluded text that the user may find useful in making decisions relevant to text selection.

In various examples, text selection module 12 may cause UI module 6 to display preview 26 within a preview area of GUI 16A. The preview area may be different from text entry area 18, or a display area (e.g., if GUI 16A is associated with a web browser or other program used primarily for reading text). In some such implementations, UI module 6 may demarcate the preview area from text entry area 18 (or the display area, as the case may be), such that GUI 16A includes a visible element to separate the respective areas. In this manner, text selection module 12 and UI module 6 may enable a user to view occluded text and, optionally, additional text that may add context to the occluded text in a variety of ways when performing text selection.

As shown in FIG. 1A, text selection module 12 may cause UI module 6 to visually differentiate the selected text from any characters of text block 20 that are not included in the selected text. More specifically, in the example of FIG. 1A, text selection module 12 causes UI module 6 to visually differentiate the group of characters included in the words "quick brown" from the remainder of text block 20. In the specific example of FIG. 1A, the visual differentiation is illustrated with respect to displaying a box around the selected text. However, it will be appreciated that UI module 6 may visually differentiate selected text in a variety of ways, such as highlighting the text (e.g., with color or grayscale shading), changing the format of the selected text (e.g., to bold and/or italicized fonts), or by displaying GUI elements (e.g., markers) to bookend the selected text, to name a few non-limiting examples.

In various examples, gesture module 10 and/or text selection module 12 may implement context-based gesture recognition and text selection. For instance, gesture module 10 may determine a category or identity of a program that is currently executing on mobile computing device 2 (e.g., an "active program") and provides GUI 16A. Based on the category or identity of the program, gesture module 10 may determine various UI-based actions associated with particular gestures detected by UI device 4. In some examples, gesture module 10 may identify an active program as a variable text-selection program. The variable text-selection program may provide at least one UI element that enables the character string-level selection and the character-level selection. Examples of such UI elements may include an input method editor (IME), or other text-entry element.

In turn, gesture module 10 may activate a variable text-selection mode while the active program is running, thereby enabling separate character string-level and character-level selections using the gesture-based criteria described above. The variable text-selection mode may enable the character string-level selection and the character-level selection through at least the UI element described above. More specifically, the variable text-selection mode may enable a user to perform distinct string-level and character-level text selections by performing different types of slide gestures (e.g., in terms of speed, direction, or origination point).

For instance, if gesture module 10 determines that GUI 16A is provided by a program, such as an email editor, that provides a text-entry interface, gesture module 10 may set text selection as a default action associated with slide gestures detected by UI device 4. On the other hand, if gesture module 10 detects that GUI 16A is provided by a program (e.g., a web browser) that primarily presents text for reading by a user, gesture module 10 may set scrolling as the default action associated with slide gestures detected by UI device 4. In some enhanced context-based implementations, gesture module 10 may detect whether text is positioned within a text editor portion of an interface (e.g., text block 20 positioned within text entry area 18) or within a reading-based area (e.g. in a non-editable portion of a webpage presented by a browser). In this manner, gesture module 10 may implement the techniques of this disclosure to account for a context of current use of mobile computing device 2.

FIG. 1B illustrates UI 16B in a scenario in which mobile computing device 2 is used for a character-level text selection. As described, gesture module 10 may detect a character-level selection based on various characteristics of a slide gesture performed by a user (e.g., using finger 22 at UI device), such as a speed or origination point of the slide gesture. For instance, if the speed of the slide gesture is relatively slow (e.g., less than a predetermined threshold speed set by gesture module 10), then gesture module 10 may determine that the slide gesture corresponds to a character-level selection. More specifically, if gesture module 10 determines that the slide gesture is associated with a character-level selection, gesture module 10 may cause text selection module 12 to incrementally select individual characters of text block 20, as indicated by the slide gesture.

As shown in selection preview 36, the slide gesture performed using finger 22 at UI device 4 corresponds to character-level selection, as determined by gesture module 10. More specifically, the selected text includes a fragment of a single character string, namely, the first four letters of the word "quick." In other examples, a character-level selection may include portions of different character strings (e.g., the last letter of the word "the" in addition to the first four letters of the word "quick"). Stated generally, a character-level selection may enable a user to select characters in increments of (or a level of granularity corresponding to) a single character, including space characters positioned between character strings.

In several instances, gesture module 10 may detect one or more switches between a character string-level selection and a character-level selection. As examples, gesture module 10 may detect a change in speed of the slide gesture (such as an increase from a sub-threshold speed to a speed exceeding the threshold) or a change of direction of the slide gesture. For instance, gesture module 10 may detect a change in direction (e.g., from right-moving to left-moving) of the slide gesture performed using finger 22. In response, gesture module 10 may cause text selection module 12 to modify the selected text according to the change in direction of movement of the slide gesture. In the specific example of FIGS. 1A-1B, text selection module 12 may modify the selection from the words "quick brown" to the group of characters reading "quic." In some such implementations, gesture module 10 may discount or disregard a change in speed of a slide gesture that occurs between distinct character strings (e.g., at a space character or a sequence of space characters positioned between separate words). In this manner, mobile computing device 2 and components thereof may enable a user to use both of the character string-level and character-level selection techniques in combination, thereby allowing the user to modify text selections with a single slide gesture.

In some instances, gesture module 10 may implement one or more machine-learning techniques based on heuristic data collected with respect to text selection-based slide gestures. Such machine-learning techniques may also be referred to herein as intelligent or intuitive implementations. For instance, if gesture module 10 detects a relatively high number of modified text selections (e.g., based on changes in speed of movement or direction of slide gestures), gesture module 10 may determine that the current threshold speed is low, causing a significant number of erroneous character string-level selections. Based on a determination of a low threshold speed, gesture module 10 may adjust the threshold speed (e.g., by raising the threshold speed) to mitigate erroneous character string-level selections in the future. In these and other implementations, gesture module 10 may associate particular threshold speeds (and/or adjustments thereof) to particular user accounts through which a user may log in to use mobile computing device 2. In this manner, gesture module 10 may implement the text selection techniques of this disclosure in conjunction with machine-learning in order to potentially improve performance over time.

Figure 2:
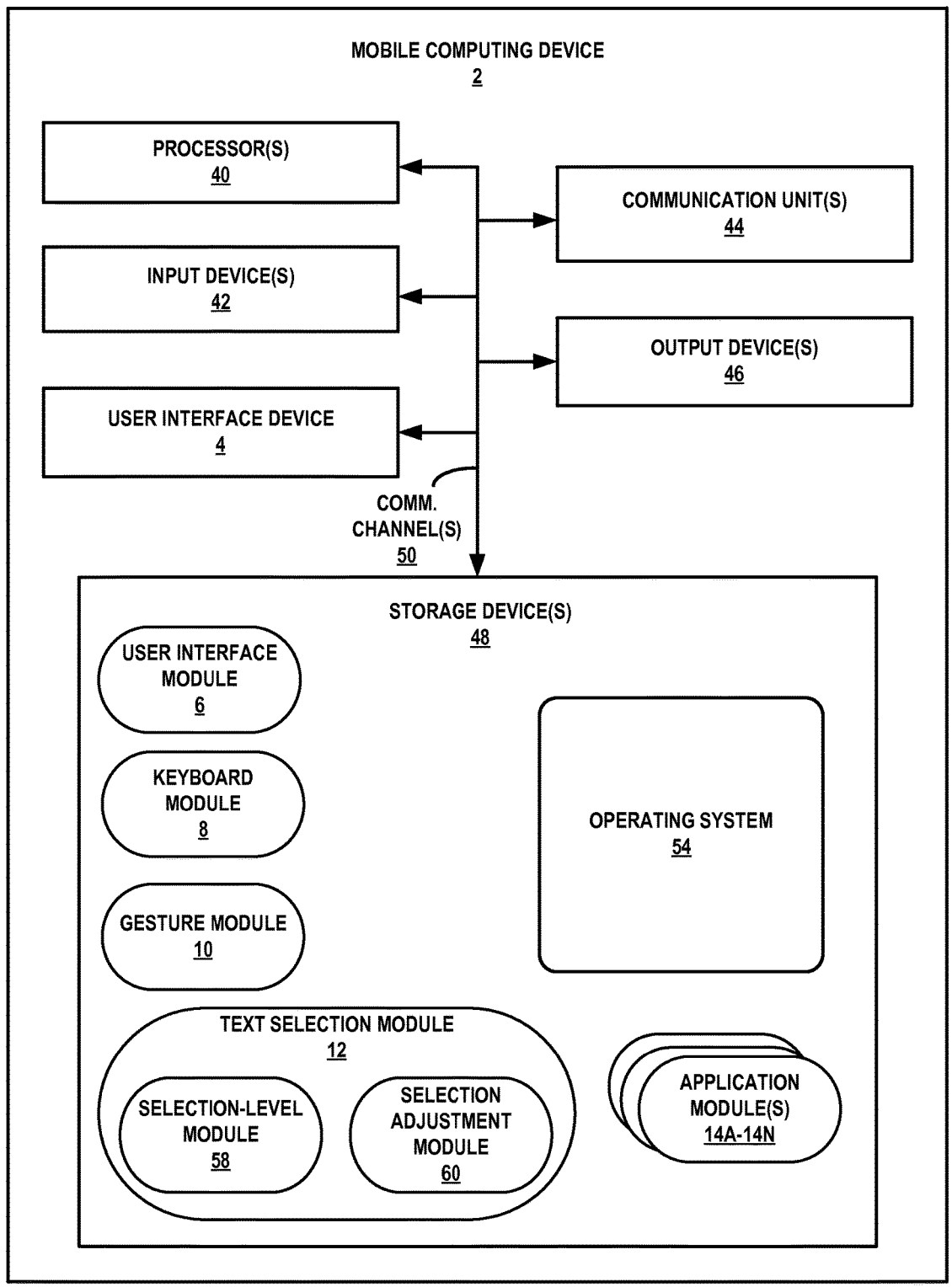
FIG. 2 is a block diagram illustrating further details of one example implementation of the computing device of FIGS. 1A-1B.

FIG. 2 is a block diagram illustrating further details of one example implementation of mobile computing device 2 of FIGS. 1A-1B. Commonly numbered elements of FIGS. 1A-2 may operate similarly. For ease of discussion, only those elements with different element numbers from FIGS. 1A-1B are described with respect to FIG. 2. It will be appreciated that other implementations of mobile computing device 2 shown in FIG. 1 may perform one or more techniques of this disclosure, and that different implementations may be used in various instances. Although shown in FIGS. 1 and 2 as a stand-alone computing device 2 for purposes of example, computing device 2 may be any component or system that includes a processor (e.g., processor 40) or other suitable computing environment for executing software instructions and, for example, need not one or more of the elements shown in FIG. 2 (e.g., input devices 42, user interface device 4, output devices 46).

As shown in the example of FIG. 2, mobile computing device 2 may include one or more processors 40, one or more input devices 42, one or more communication units 44, one or more output devices 46, one or more storage devices 48, and user interface (UI) device 4. Mobile computing device 2, in one implementation, further includes application modules 14A-14N and operating system 54, that are executable by mobile computing device 2. Each of components 4, 40, 42, 44, 46, and 48 may be interconnected (physically, communicatively, and/or operatively) for inter-component communications. In some examples, communication channel(s) 50 may include a system bus, network connection, inter-process communication data structure, or any other channel for communicating data. As one example in FIG. 2, components 4, 40, 42, 44, 46, and 48 may be coupled by one or more communication channel(s) 50. Application modules 14 and operating system 54 may also communicate information with one another as well as with other components in mobile computing device 2.

Processor(s) 40, in one example, are configured to implement functionality and/or process instructions for execution within mobile computing device 2. For example, processor(s) 40 may be capable of processing instructions stored in storage device(s) 48. Examples of processor(s) 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within mobile computing device 2 during operation. Storage device(s) 48, in some examples, are described as a computer-readable storage medium and/or as one or more computer-readable storage devices. In some examples, storage devices 48 comprise temporary memory, meaning that a primary purpose of storage device(s) 48 is not long-term storage. Storage device(s) 48, in some examples, are described as a volatile memory, meaning that storage device(s) 48 do not maintain stored contents when the computer is turned off. Examples of volatile memories include random access memories (RAM), dynamic random access memories (DRAM), static random access memories (SRAM), and other forms of volatile memories known in the art. In some examples, storage device(s) 48 are used to store program instructions for execution by processor(s) 40. Storage device(s) 48, in one example, are used by software or applications running on mobile computing device 2 (e.g., application modules 14) to temporarily store information during program execution.

Storage device(s) 48, in some examples, also include one or more computer-readable storage media. Examples of such computer-readable storage media may include a non-transitory computer-readable storage medium, and various computer-readable storage devices. Storage device(s) 48 may be configured to store larger amounts of information than volatile memory. Storage device(s) 48 may further be configured for long-term storage of information. In some examples, storage device(s) 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Mobile computing device 2, in some examples, also includes one or more communication units 44. Mobile computing device 2, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth®, 3G, 4G, and WiFi® radios computing devices as well as Universal Serial Bus (USB). In some examples, mobile computing device 2 utilizes communication unit 44 to wirelessly communicate with an external device.

Mobile computing device 2, in one example, also includes one or more input devices 42. Input device(s) 42, in various examples, are configured to receive input from a user through tactile, audio, or video feedback. Examples of input device(s) 42 include a presence-sensitive display (such as a touchscreen), a mouse, a keyboard, a voice responsive system, video camera, microphone or any other type of device for detecting a command from a user. In some examples, a presence-sensitive display includes a touch-sensitive screen.

One or more output devices 46 may also be included in mobile computing device 2. Output device(s) 46, in some examples, are configured to provide output to a user using tactile, audio, or video stimuli. Output device(s) 46, in various examples, include a presence-sensitive display (e.g., a touchscreen), a sound card, a video graphics adapter card, or any other type of device for converting a signal into an appropriate form understandable to humans or machines. Additional examples of output device(s) 46 include a speaker, a cathode ray tube (CRT) monitor, a liquid crystal display (LCD), or any other type of device that can generate intelligible output to a user. In some examples, UI device 4 may include functionality of input device(s) 42 and/or output device(s) 46. In the example of FIG. 2, UI device 4 may include, be, or be part of a presence-sensitive screen, such as a touch-sensitive screen, a touchscreen, or the like.

In some examples, UI device 4 may include functionality of input device 42 and/or output device 46. In the example of FIG. 2, UI device 4 may be a presence-sensitive display. In some examples, a presence-sensitive display may detect an object at and/or near the screen of the presence-sensitive display. As one non-limiting example range, a presence-sensitive display may detect an object, such as a finger or stylus, which is within 2 inches or less of the physical screen of the presence-sensitive display. The presence-sensitive display may determine a location (e.g., an (x,y) coordinate) of the presence-sensitive display at or near which the object was detected. In another non-limiting example range, a presence-sensitive display may detect an object 6 inches or less from the physical screen of the presence-sensitive display, and other exemplary ranges are also possible. The presence-sensitive display may determine the location selected by the object (e.g., user's finger) using capacitive, inductive, and/or optical recognition techniques. In some examples, the presence-sensitive display provides output using tactile, audio, or video stimuli as described with respect to output device 46.

Mobile computing device 2 may include operating system 54. Operating system 54, in some examples, controls the operation of components of mobile computing device 2. For example, operating system 54, in one example, facilitates the communication of application module(s) 14 with processor(s) 40, communication unit(s) 44, storage device(s) 48, input device(s) 42, and output device(s) 46. As shown in FIG. 2, storage device(s) 48 may include UI module 6, keyboard module 8, gesture module 10, and text selection module 12, as described in FIG. 1. In turn, in the example implementation of mobile computing device 2 illustrated in FIG. 2, text selection module 12 includes sub-modules, namely, selection-level module 58 and selection adjustment module 60. Various modules illustrated in FIG. 2 may each include program instructions and/or data that are executable by computing device 2. As one example, UI module 6 may include instructions that cause mobile computing device 2 to perform one or more of the operations and actions described in the present disclosure.

As shown in FIG. 2, text selection module 12 may include selection-level module 58 and selection adjustment module 60. Selection-level module 58 may be configured or otherwise operable to determine whether a particular gesture detected at UI device 4 corresponds to a character string-level selection or to a character-level selection. In various examples, selection-level module 58 may base the determination on data received from gesture module 10, such as a speed or direction of the gesture.

Additionally, selection-level module 58 may dynamically switch between the character string-level and character-level selections based on changes in characteristics of the slide gesture (e.g., as discerned by gesture module 10). For instance, selection-level module 58 may switch from the character string-level selection to the character-level selection based on a reduction in speed (e.g., a drop from a speed faster than a threshold speed to a speed slower than the threshold speed).

In these and other examples, selection-level module 58 may discern whether a gesture detected at UI device 4 corresponds to a text selection at all. For instance, selection-level module 58 may use an orientation of a slide gesture to distinguish between text-selection gestures and other types (e.g., scrolling) gestures. As one example, selection-level module 58 may correlate a horizontal (e.g., substantially parallel to a height-edge of UI device 4) slide gesture to a scrolling operation. More specifically, in this example, if selection-level module 58 receives an indication of the horizontal slide gesture, selection-level module 58 may decline to select any text that is currently displayed at UI device 4. Instead, selection-level module 58 may relay the indication of the gesture to other modules executing on mobile computing device 2, such as one or more of application modules 14.

In turn, one or more of application modules 14 may perform the scrolling operation (e.g., by causing UI module 6 to adjust the UI currently displayed at UI device 4 to display text that was not visible until execution of the scrolling operation). In these and other examples, selection-level module 58 may be configured or otherwise operable to differentiate slide gestures from other types of gestures (such as "flick" gestures, or "hold and drag" gestures) that are commonly used for purposes other than text-selection (e.g., for scrolling or for moving icons within the GUI).

As shown in FIG. 2, text selection module 12 may also include selection adjustment module 60. Selection adjustment module 60 may be configured or otherwise operable to modify (or fine-tune) a text selection, such as a character string-level selection of one or more distinct strings. As one example, selection adjustment module 60 may implement the hybrid text-selection techniques described above with respect to FIG. 1. For instance, selection adjustment module 60 may enable a user to adjust a character string-level text selection (e.g. including multiple distinct strings) at a level of particularity corresponding to a single character.

In some scenarios, selection adjustment module 60 may receive, from gesture module 10, an indication of a change in speed or a change in direction of a slide gesture. In various examples, a change in speed (e.g., a drop from an above-threshold speed to a below-threshold speed), or a change in direction (e.g., a 180-degree change from a right-moving slide to a left-moving slide) may indicate a shift from a character string-level selection to a character-level selection (or vice-versa). As one example, selection adjustment module 60 may enable a user to deselect (e.g., in increments of single characters) portions of strings previously selected using the character string-level selection.

In these and other implementations, selection adjustment module 60 may output, for display at UI device 4, at least two selection handles. For instance, a first selection handle may be positioned before the selected character string(s), and a second selection handle may be positioned after the selected character string(s). In turn, selection adjustment module 60 may receive, via UI device 4, an indication of a contact input corresponding to an initial position of the second selection handle. In examples, gesture module 10 may receive the indication of the contact input and relay the indication to selection adjustment module 60.

Additionally, selection adjustment module 60 may receive an indication of a movement beginning at the initial position of the second selection handle (e.g., to an updated position different from the initial position). In turn, selection adjustment module 60 may cause UI module 6 to modify the UI to display the second selection handle at the updated position. If the transition from the initial position to the updated position includes additional characters that were not included in the selected group, selection adjustment module 60 may select these additional characters (e.g., add the additional characters to the existing text selection).

Conversely, if the transition from the initial position to the updated position includes one or more characters that are already part of the selected group of characters, selection adjustment module 60 may deselect those characters covered by the transition. In various examples, selection adjustment module 60 may deselect the character(s) such that the deselected character(s) are no longer visually differentiated from characters that were not included in the original text selection. In this manner, selection adjustment module 60 may implement techniques of this disclosure to enable a user to adjust or fine-tune an existing text selection in a variety of ways.

In some examples, text selection module 12 may implement the text selection techniques of this disclosure in a "sticky" manner, such as at semantically meaningful character positions within a word (e.g., beginning of suffixes). For example, selection-level module 58 may determine or reevaluate the current selection level at the positions denoted by an asterisk ("*") in the following strings: "jump*ing," "swim*s," and "grace*ful." In this manner, text selection module 12 may facilitate selection of characters that a user is likely to edit (e.g., change from "jumping" to "jumped").

While selection adjustment techniques are described separately with regards to changes in gestural direction/speed and through the use of selection handles for purposes of clarity, it will be appreciated that selection module 60 may implement the techniques in various combinations. As one example, selection module 60 may invoke display of the selection handles based on a detection of a change in gestural direction and/or speed. In other words, selection module 60 may offer a user the selection handle-based adjustment option based on an indication (either explicit or implicit) of a change between a character string-level and a character-level selection.

Figure 3A:
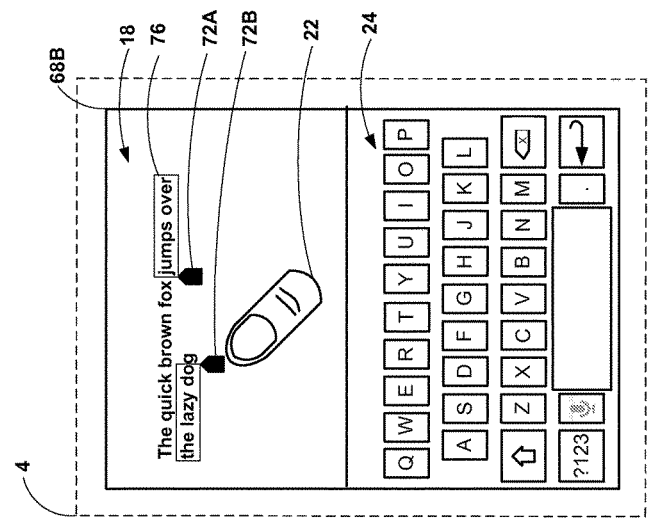
FIGS. 3A-3B are conceptual diagrams illustrating user interfaces (UI's) that a computing device may provide in various implementations to implement one or more text selection techniques of this disclosure.
Figure 3B:
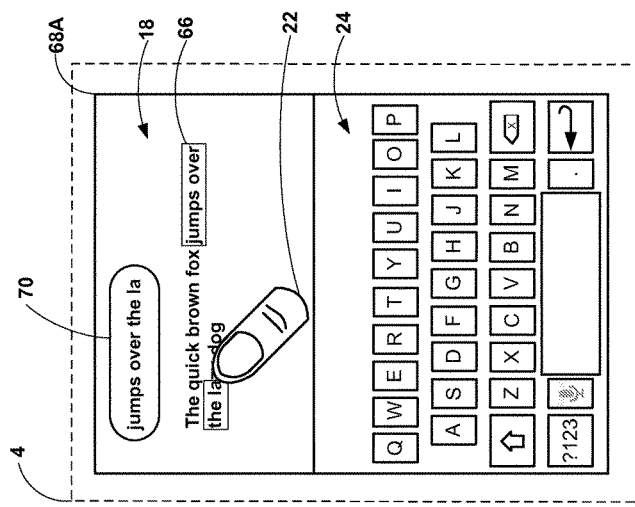

FIGS. 3A-3B are conceptual diagrams illustrating user interfaces (UIs) 68A-68B that a computing device may provide in various implementations to implement one or more text-selection techniques of this disclosure. More specifically, FIGS. 3A-3B illustrate example UIs that a computing device may output while implementing the selection adjustment techniques described herein. Several elements of FIGS. 3A-3B share numbers with corresponding elements of FIGS. 1A-1B. Commonly numbered elements of FIGS. 1A-1B and 3A-3B may operate similarly. For ease of discussion, only those elements with different element numbers from FIGS. 1A-1B are described with respect to FIGS. 3A-3B. Additionally, various functionalities described with respect to FIGS. 3A-3B may be described in the context of devices and/or modules illustrated in FIGS. 1A-1B and FIG. 2.

FIG. 3A illustrates GUI 68A, in which text selection 66 includes the following character sequence: "jumps over the la." More specifically, text selection 66 includes three distinct character strings (namely, "jumps," "over" and "the") of the available text block, and a portion of a fourth character string (namely, the characters "la" of the string "lazy"). In this example, mobile computing device 2 (or components thereof, such as gesture module 10 and/or text selection module 12) may detect a change in direction and/or speed of a slide gesture performed using finger 22.

For instance, the initial speed of the slide gesture may correspond to a character string-level selection (e.g., the initial speed may exceed a predetermined threshold speed required to indicate a character string-level selection). Based on the initial speed and a distance covered by the slide gesture, text selection module 12 may select one or more distinct character strings of the available text, such as the following sequence of strings: "jumps over the lazy."

In one example, selection adjustment module 60 may detect a change in the direction of the slide gesture. For instance, selection adjustment module 60 may detect that finger 22, after reaching or nearing the end of the string "lazy," moves in a leftward direction along UI device 4. In response, selection adjustment module 60 may cause selection-level module 58 to switch from a character string-level selection to a character-level selection. Additionally, selection adjustment module 60 may deselect individual characters of the original text selection based on a distance covered by finger 22 after the change in gestural direction.

In another example, selection adjustment module 60 may detect a change in the speed of the slide gesture. For instance, selection adjustment module 60 may detect that the initial speed of the slide gesture is greater than the threshold speed that is defined to indicate a character string-level selection, while the change in speed represents a drop below the threshold speed. In the specific example of FIG. 3A, selection adjustment module 60 may detect the change in gestural speed at or about a time when finger 22 is positioned between the "a" and "z" characters in the string "lazy."

In either scenario described above, selection adjustment module 60 may modify the existing text selection (e.g., of one or more entire character strings of the text block) to arrive at text selection 66. As described, text selection 66 may represent a hybrid text selection (e.g., a text selection that was formed using both character string-level and character-level selection mechanisms).

Additionally, in the example of FIG. 3A, GUI 68A includes selection preview 70, which illustrates the characters included in text selection 66. In various examples, UI module 6 may dynamically update selection preview 70 to reflect adjustments to text selection 66 (e.g., as effected by selection adjustment module 60), thereby providing a user with a real-time representation of selected text. UI module 6 may determine a location of selection preview within GUI 68A based on various criteria. As one example, UI module 6 may identify one or more regions of GUI 68A that are not obstructed by (e.g., through direct contact with) finger 22. As another example, UI module 6 may identify a region of GUI 68A where a text-entry UI element is not currently displayed. In turn, UI module 6 may display selection preview 70 in one or more of the identified region(s).

FIG. 3B illustrates GUI 68B, in which text selection 76 includes four distinct character strings (namely, "jumps," "over," "the," and "lazy") and a portion of a fifth string (namely, the characters "d" and "o" of the string "dog"). Additionally, GUI 68B includes selection handles 72A-72B ("selection handles 72"). As described, selection adjustment module 60 may cause UI module 6 to display selection handles 72, based on selection adjustment module 60 detecting a change in gestural change in direction and/or speed.

Upon displaying selection handles 72, selection adjustment module 60 may enable a user to fine tune an original text selection to arrive at text selection 76. For instance, the user may provide a contact input by placing finger 22 at a location corresponding to an initial position of selection handle 72A. The user may then drag finger 22 along UI device 4 to place selection handle 72A at its illustrated position, thereby deselecting the character "g." While described with respect to contact-based input (e.g., where UI device 4 includes a touchscreen) for ease of discussion, it will be appreciated that the techniques described with respect to FIGS. 3A-3B may be performed using presence-based input (e.g., where UI device 4 includes a presence-sensitive display other than a touchscreen).

In some examples, selection adjustment module 60 may enable a user to supplement text selection 76 using selection handles 72. As one example, the user may provide a contact input at a position of selection handle 72A, and drag selection handle 72A to the left to select additional characters, thereby effectively adding characters to text selection 76. Through the use of selection handles 72, selection adjustment module 60 may, according to some examples, enable a user to more accurately and precisely arrive at a desired text selection, mitigating error, inaccuracy and inefficiency caused by the fat finger problem.

Figure 4:
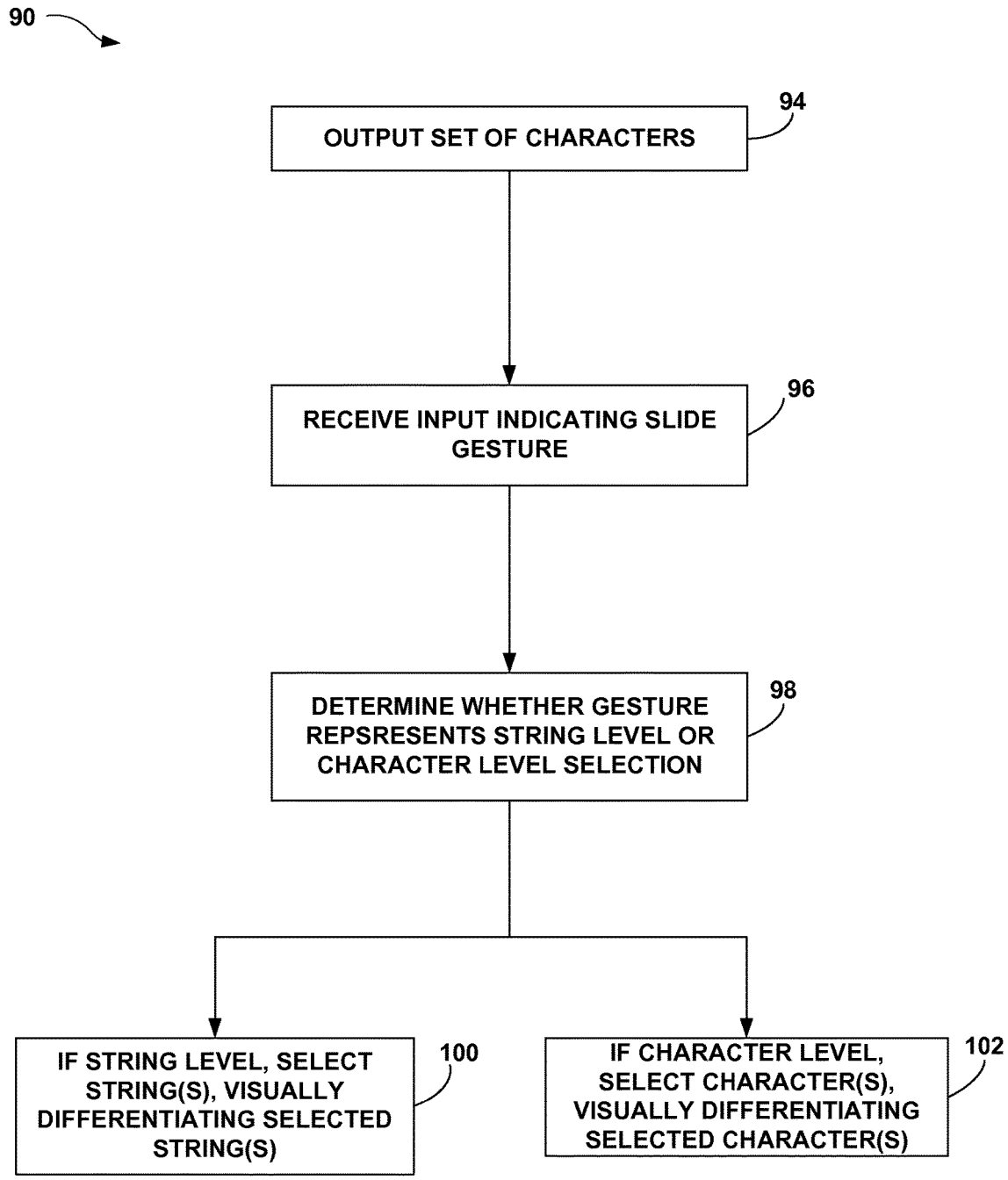
FIG. 4 is a flowchart illustrating an example process that a computing device may perform in implementing one or more of the text selection techniques of this disclosure.

FIG. 4 is a flowchart illustrating an example process 90 that a computing device may perform in implementing one or more of the text selection techniques of this disclosure. Although process 90 may be performed by any device implementing one or more techniques described herein, for purposes of illustration only, process 90 is described herein with respect to mobile computing device 2 as illustrated in FIG. 2. Process 90 may begin when UI module 6 outputs, for display at an output device, such as UI device 4, a plurality (e.g., a set) of characters (94). As described, UI device 4 may include, be, or be part of several types of devices, including one or more presence-sensitive devices, such as one or more touchscreens.

Additionally, gesture module 10 may receive an input indicative of a slide gesture across one or more regions of a presence-sensitive display device (in one example, UI device 4) that display a group of characters included in the plurality of characters (96). For instance, in one non-limiting scenario, gesture module 10 may detect that the gesture covers a region of UI device 4 where a group of ten characters is displayed. In turn, the ten-character grouping may represent one or more distinct character strings, or portions of one or more such strings. As one example, the group of characters may include two full character strings, and two characters of another character string. Distinct character strings may be demarcated from one another by one or more space characters (e.g., by a single space character or by a sequence of two or more consecutive space characters).

Additionally, selection-level module 58 may determine whether the slide gesture represents a character string-level selection or a character-level selection from the group of characters (98). In examples, the character string-level selection may be associated with a multi-character selection of a character string from the group of characters without incrementally selecting any individual characters included in the character string. With respect to the particular example described above, the character string-level selection may be associated with selecting the entire character including the last two characters covered by the slide gesture. In other words, in the context of a character string-level selection, if the slide gesture covers a portion (e.g., a single character or some minimum number of characters) of a string, the entire string may be selected.

On the other hand, the character-level selection may be associated with incrementally selecting single characters of the group. For instance, in the example described above, the character-level selection may be associated with a selection of the first two character strings and the two characters of the third character string. In other words, the character-level selection may have a level of granularity or specificity corresponding to a single character.

In various examples, selection-level module 58 may make the determination of 98 based on one or more factors, such as one or more of an origination point, a direction of movement, and a speed of movement associated with the slide gesture across the region(s) of UI device 4 that display the group of characters. In an example where selection-level module 58 bases the determination on an origination point of the slide gesture, selection-level module 58 may detect a character string-level selection if the gesture has an origination point positioned between distinct character strings (e.g. at a space character that demarcates the strings). Conversely, selection-level module 58 may detect a character-level selection if the gesture has an origination point positioned within a string.

In an example where selection-level module 58 makes the determination based on the speed of movement associated with the slide gesture, selection-level module 58 may detect a character string-level selection if the speed of the slide gesture exceeds a predetermined threshold speed. Alternatively, selection-level module 58 may detect a character-level selection if the speed of the slide gesture is slower than the predetermined threshold speed. In instances where selection-level module 58 determines that users (or a particular user) frequently adjusts text selections (e.g., using the functionalities of selection adjustment module 60), selection-level module 58 may change the threshold speed to improve accuracy of future selection-level determinations. In this manner selection-level module 58 may use past heuristics and/or machine-learning techniques to determine selection levels.

Responsive to determining that the slide gesture represents the character-string level selection from the group of characters, text selection module 12 may graphically select, at UI device 4, at least one character string included in the group of characters, such that the at least one selected character string is visually differentiated from any of the plurality of characters not included in the group of characters (100). As described, text selection module 12 may cause UI module 6 to differentiate the selected character string(s) in a variety of ways, such as by highlighting the selected string(s), displaying a box around the selected string(s), or by changing the font formatting associated with the selected strings. In some instances, such as when text selection module 12 detects that a portion of the plurality of characters is visually occluded by a finger, stylus, or other input object, text selection module 12 may cause UI module 6 to display a text preview via UI device 4. The text preview may include all or a portion of the selected text, and may optionally include other characters of the plurality as well.

In contrast, responsive to determining that the slide gesture represents a character-level selection from the group of characters, text selection module 12 may graphically select, at UI device 4, at least one character included in the group of characters, such that the at least one selected character is visually differentiated from at any of the plurality of characters not included in the group of characters. In some examples, text selection module 12 may incrementally select characters of the group, thereby enabling a user to add (or remove) portions of the text selection on a character-by-character basis.

Figure 5:
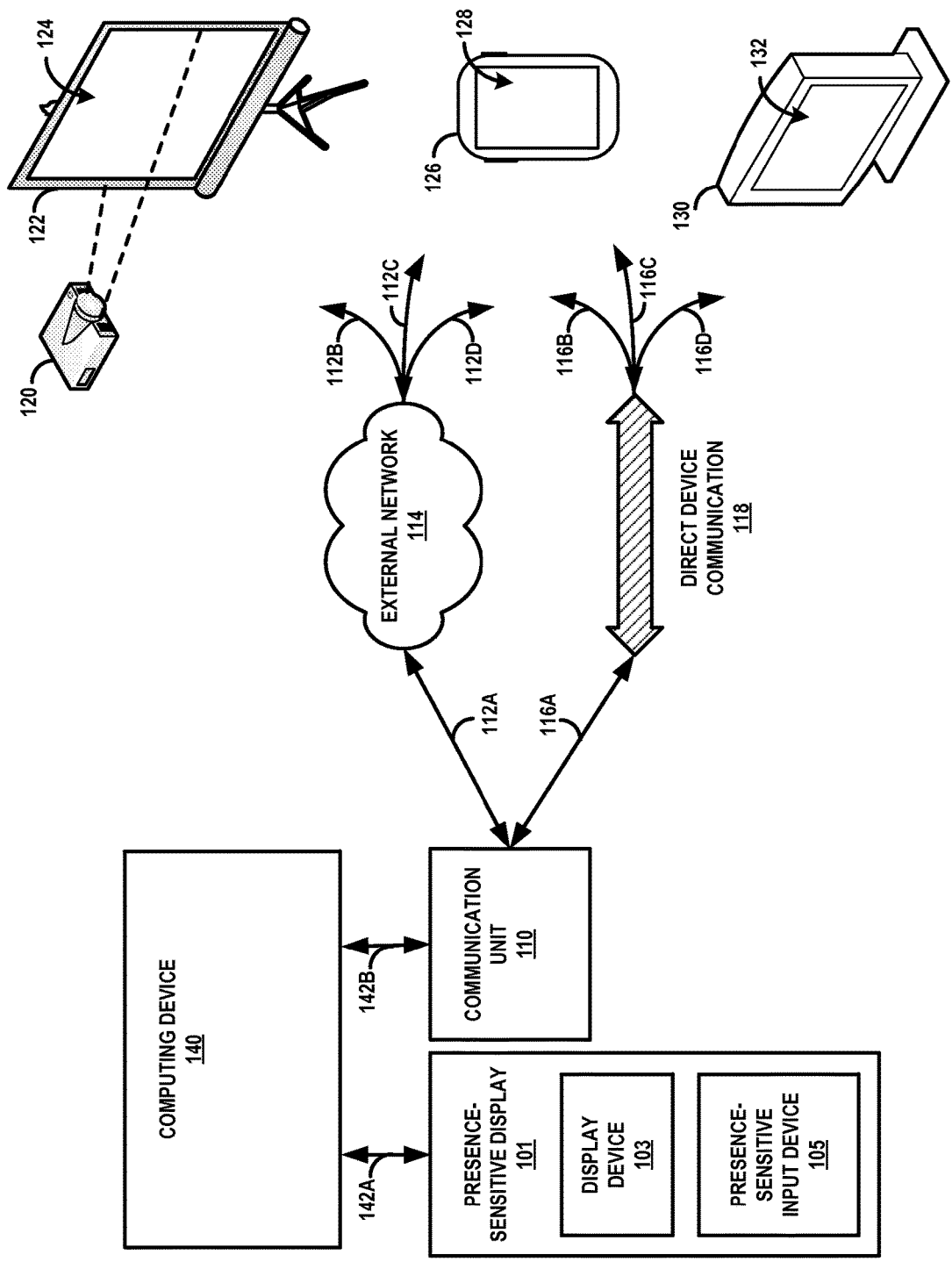
FIG. 5 is a block diagram illustrating an example computing device that outputs graphical content for display at a remote device, in accordance with one or more techniques of the present disclosure.

FIG. 5 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 5 includes a computing device 140, presence-sensitive display 101, communication unit 110, projector 120, projector screen 122, mobile device 126, and visual display device 130. Although shown for purposes of example in FIGS. 1 and 2 as a stand-alone mobile computing device 2, a computing device such as computing device 140 may, generally, be any component or system that includes a processor or other suitable computing environment for executing software instructions and, for example, need not include a presence-sensitive display.

As shown in the example of FIG. 5, computing device 140 may be a processor that includes functionality as described with respect to processor 40 in FIG. 2. In such examples, computing device 140 may be operatively coupled to presence-sensitive display 101 by a communication channel 142A, which may be a system bus or other suitable connection. Computing device 140 may also be operatively coupled to communication unit 110, further described below, by a communication channel 142B, which may also be a system bus or other suitable connection. Although shown separately as an example in FIG. 5, computing device 140 may be operatively coupled to presence-sensitive display 101 and communication unit 110 by any number of one or more communication channels.

In other examples, such as illustrated previously by mobile computing device 2 in FIGS. 1-2, a computing device may refer to a portable or mobile device such as mobile phones (including smart phones), laptop computers, etc. In some examples, a computing device may be a desktop computers, tablet computers, smart television platforms, cameras, personal digital assistants (PDAs), servers, mainframes, etc.

Presence-sensitive display 101, like UI device 4 as shown in FIG. 1, may include display device 103 and presence-sensitive input device 105. Display device 103 may, for example, receive data from computing device 140 and display the graphical content. In some examples, presence-sensitive input device 105 may determine one or more user inputs (e.g., continuous gestures, multi-touch gestures, single-touch gestures, etc.) at presence-sensitive display 101 using capacitive, inductive, and/or optical recognition techniques and send indications of such user input to computing device 140 using communication channel 142A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed. In other examples, presence-sensitive input device 105 may be positioned physically apart from display device 103, and locations of presence-sensitive input device 105 may correspond to locations of display device 103, such that input can be made at presence-sensitive input device 105 for interacting with graphical elements displayed at corresponding locations of display device 103.

As shown in FIG. 5, computing device 140 may also include and/or be operatively coupled with communication unit 110. Communication unit 110 may include functionality of communication unit 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 140 may also include and/or be operatively coupled with one or more other devices, e.g., input devices, output devices, memory, storage devices, etc. that are not shown in FIG. 5 for purposes of brevity and illustration.

FIG. 5 also illustrates a projector 120 and projector screen 122. Other such examples of projection devices may include electronic whiteboards, holographic display devices, and any other suitable devices for displaying graphical content. Projector 120 and projector screen 122 may include one or more communication units that enable the respective devices to communicate with computing device 140. In some examples, the one or more communication units may enable communication between projector 120 and projector screen 122. Projector 120 may receive data from computing device 140 that includes graphical content. Projector 120, in response to receiving the data, may project the graphical content onto projector screen 122. In some examples, projector 120 may determine one or more user inputs (e.g., continuous gestures, multi-touch gestures, single-touch gestures, etc.) at projector screen using optical recognition or other suitable techniques and send indications of such user input using one or more communication units to computing device 140. In such examples, projector screen 122 may be unnecessary, and projector 120 may project graphical content on any suitable medium and detect one or more user inputs using optical recognition or other such suitable techniques.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic whiteboard), may receive data from computing device 140 and display the graphical content. In some examples, presence-sensitive display 124 may determine one or more user inputs (e.g., continuous gestures, multi-touch gestures, single-touch gestures, etc.) at projector screen 122 using capacitive, inductive, and/or optical recognition techniques and send indications of such user input using one or more communication units to computing device 140.

FIG. 5 also illustrates mobile device 126 and visual display device 130. Mobile device 126 and visual display device 130 may each include computing and connectivity capabilities. Examples of mobile device 126 may include e-reader devices, convertible notebook devices, hybrid slate devices, etc. Examples of visual display device 130 may include other semi-stationary devices such as televisions, computer monitors, etc. As shown in FIG. 5, mobile device 126 may include a presence-sensitive display 128. Visual display device 130 may include a presence-sensitive display 132. Presence-sensitive displays 128, 132 may include a subset of functionality or all of the functionality of UI device 4 as described in this disclosure. In some examples, presence-sensitive displays 128, 132 may include additional functionality. In any case, presence-sensitive display 132, for example, may receive data from computing device 140 and display the graphical content. In some examples, presence-sensitive display 132 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 140.

As described above, in some examples, computing device 140 may output graphical content for display at presence-sensitive display 101 that is coupled to computing device 140 by a system bus or other suitable communication channel. Computing device 140 may also output graphical content for display at one or more remote devices, such as projector 120, projector screen 122, mobile device 126, and visual display device 130. For instance, computing device 140 may execute one or more instructions to generate and/or modify graphical content in accordance with techniques of the present disclosure. Computing device 140 may output the data that includes the graphical content to a communication unit of computing device 140, such as communication unit 110. Communication unit 110 may send the data to one or more of the remote devices, such as projector 120, projector screen 122, mobile device 126, and/or visual display device 130. In this way, computing device 140 may output the graphical content for display at one or more of the remote devices. In some examples, one or more of the remote devices may output the graphical content at a presence-sensitive display that is included in and/or operatively coupled to the respective remote devices.

In some examples, computing device 140 may not output graphical content at presence-sensitive display 101 that is operatively coupled to computing device 140. In other examples, computing device 140 may output graphical content for display at both a presence-sensitive display 101 that is coupled to computing device 140 by communication channel 142A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 140 and output for display at presence-sensitive display 101 may be different than graphical content display output for display at one or more remote devices.

Computing device 140 may send and receive data using any suitable communication techniques. For example, computing device 140 may be operatively coupled to external network 114 using network link 112A. Each of the remote devices illustrated in FIG. 5 may be operatively coupled to network external network 114 by one of respective network links 112B, 112C, and 112D. External network 114 may include network hubs, network switches, network routers, etc., that are operatively inter-coupled thereby providing for the exchange of information between computing device 140 and the remote devices illustrated in FIG. 5. In some examples, network links 112A-112D may be Ethernet, ATM or other network connections. Such connections may be wireless and/or wired connections.

In some examples, computing device 140 may be operatively coupled to one or more of the remote devices included in FIG. 5 using direct device communication 118. Direct device communication 118 may include communications through which computing device 140 sends and receives data directly with a remote device, using wired or wireless communication. That is, in some examples of direct device communication 118, data sent by computing device 140 may not be forwarded by one or more additional devices before being received at the remote device, and vice-versa. Examples of direct device communication 118 may include Bluetooth, Near-Field Communication, Universal Serial Bus, WiFi, infrared, etc. One or more of the remote devices illustrated in FIG. 5 may be operatively coupled with computing device 140 by communication links 116A-116D. In some examples, communication links 116A-116D may be connections using Bluetooth, Near-Field Communication, Universal Serial Bus, infrared, etc. Such connections may be wireless and/or wired connections.

In accordance with techniques of the disclosure, computing device 140 may be operatively coupled to visual display device 130 using external network 114. Computing device 140 may output a graphical keyboard for display at presence-sensitive display 132. For instance, computing device 140 may send data that includes a representation of the graphical keyboard to communication unit 110. Communication unit 110 may send the data that includes the representation of the graphical keyboard to visual display device 130 using external network 114. Visual display device 130, in response to receiving the data using external network 114, may cause presence-sensitive display 132 to output the graphical keyboard. In response to a user performing a gesture at presence-sensitive display 132 (e.g., at a region of presence-sensitive display 132 that outputs the graphical keyboard), visual display device 130 may send an indication of the gesture to computing device 140 using external network 114. Communication unit 110 of may receive the indication of the gesture, and send the indication to computing device 140.

In one example, computing device 140 is configured to output, for display at one or more of display device 103 and presence-sensitive displays 124, 128, and 132, an indication of a plurality of characters, and receive an input indicative of a slide gesture across one or more regions of one or more of presence-sensitive input device 105 and presence-sensitive displays 124, 128, and 132, that are associated with a group of characters included in the plurality of characters. Computing device 140, in this example, is further configured to determine whether the slide gesture represents a character string-level selection or a character-level selection from the group of characters, where the character string-level selection includes a multi-character selection of a character string from the group of characters without incrementally selecting any individual characters included in the character string, and where the determining is based at least in part on one or more of an origination point, a direction of movement, and a speed of movement associated with the slide gesture across the one or more regions of one or more of presence-sensitive input device 105 and presence-sensitive displays 124, 128, and 132 that are associated with the group of characters. In this example, computing device 140 is further configured to, responsive to determining that the slide gesture represents the character string-level selection from the group of characters, graphically select, at one or more of display device 103 and presence-sensitive displays 124, 128, and 132, at least one character string included in the group of characters, such that the at least one selected character string is visually differentiated from any of the plurality of characters not included in the group of characters, and responsive to determining that the slide gesture represents the character-level selection from the group of characters, graphically select, at one or more of display device 103 and presence-sensitive displays 124, 128, and 132, at least one character included in the group of characters, such that the at least one selected character is visually differentiated from any of the plurality of characters not included in the group of characters.

Techniques described herein may be implemented, at least in part, in hardware, software, firmware, or any combination thereof. For example, various aspects of the described embodiments and/or implementations may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium and/or a computer-readable storage device encoded with instructions. Instructions embedded or encoded in an article of manufacture including an encoded computer-readable storage medium and/or a computer-readable storage device, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. Additional examples of computer readable medium include computer-readable storage devices, computer-readable memory, and tangible computer-readable medium. In some examples, an article of manufacture may comprise one or more computer-readable storage media.

In some examples, computer-readable storage media may comprise non-transitory media. The term "non-transitory" may indicate that the storage medium is tangible and is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
    outputting, by a computing device that includes one or more processors, for display, a plurality of characters;
    receiving, by the computing device, an input indicative of a slide gesture across one or more regions of a presence-sensitive input device, the one or more regions being associated with a group of characters included in the plurality of characters;
    determining, by the computing device and based at least in part on one or more of an origination point and a speed of movement associated with the slide gesture, whether the slide gesture represents a character string-level selection or a character-level selection from the group of characters, wherein the character string-level selection comprises a multi-character selection of a character string from the group of characters;
    responsive to determining that the slide gesture represents the character string-level selection from the group of characters and determining that the input indicative of the slide gesture covers only a portion of at least one character string included in the group of characters, outputting, by the computing device and for display, a graphical selection of the at least one character string, such that the at least one character string is visually differentiated from any of the plurality of characters not included in the group of characters, wherein the at least one character string comprises two or more consecutive characters included in the group of characters, and wherein the at least one character string does not comprise any space characters; and
    responsive to determining that the slide gesture represents the character-level selection from the group of characters, outputting, by the computing device, for display and in single character increments, a graphical selection of at least one character included in the group of characters, such that the at least one character is visually differentiated from any of the plurality of characters not included in the group of characters: and
    outputting, for display and in a preview area of a user interface (UI), one or more occluded characters of the plurality of characters,
    wherein the plurality of characters is displayed at a display area of the UI,
    wherein the computing device detects a user contact at a region of the presence-sensitive input device that is associated with the one or more occluded characters, and
    wherein the preview area of the UI is different from the display area of the UI.

2. The method of claim 1, wherein the at least one character string is demarcated from remaining characters of the plurality of characters by one or more space characters.

3. The method of claim 1, wherein outputting the one or more occluded characters in the preview area of the UI further comprises:
    outputting, for display in the preview area of the UI, at least one full line of characters of the plurality of characters.

4. The method of claim 1, further comprising:
    detecting, by the computing device and based at least in part on at least one of 1) a change in a direction of movement associated with the slide gesture and 2) a change in the speed of movement associated with the slide gesture, a change between the character string-level selection and the character-level selection.

5. The method of claim 1, further comprising:
outputting, for display in a user interface (UI), at least two selection handles, such that at least a first selection handle is positioned before the at least one character string or before the at least one character within the UI, and a second selection handle is positioned after the at least one character string or after the at least one character within the UI.

6. The method of claim 5, further comprising:
receiving an indication of a contact input, the contact input corresponding to an initial position of the second selection handle;
receiving an indication of a movement beginning at the initial position of the second selection handle;
modifying the UI to display the second selection handle at an updated position, the updated position being different from the initial position of the second selection handle; and
selecting at least one additional character of the plurality of characters,
wherein the at least one additional character is different from the at least one character string and different from the at least one character, and
wherein the at least one additional character is visually differentiated from any of the plurality of characters not included in the group of characters.

7. The method of claim 5, further comprising:
receiving an indication of a contact input, the contact input corresponding to an initial position of the second selection handle;
receiving an indication of a movement beginning at the initial position of the second selection handle;
modifying the UI to display the second selection handle at an updated position, the updated position being different from the initial position of the second selection handle; and
deselecting at least a first character of the at least one character string or the at least one character, such that the at least one deselected character is no longer visually differentiated from the plurality of characters not included in the group of characters.

8. The method of claim 1, wherein determining whether the slide gesture represents the character string-level selection or the character-level selection is further based on whether one or more previously selected characters of the plurality of characters are associated with the character string-level selection or the character-level selection.

9. The method of claim 1, further comprising:
identifying, by the computing device, an active program that provides the computing device with the plurality of characters;
determining, by the computing device, whether the active program is classified as a variable text-selection program, the variable text-selection program providing at least one user interface (UI) element that enables the character string-level selection and the character-level selection; and
responsive to determining that the identified active program is classified as a variable text-selection program, configuring the computing device to operate in a variable text-selection mode, the variable text-selection mode enabling the character string-level selection and the character-level selection through the at least one UI element.

10. The method of claim 1, further comprising:
determining, by the computing device, whether the plurality of characters is received at a text-editor portion of a user interface (UI) provided by a program executing at the computing device;
determining, by the computing device, whether the active program is classified as a variable text-selection program, the variable text-selection program providing at least one user interface (UI) element that enables the character string-level selection and the character-level selection; and
responsive to determining that the identified active program is classified as a variable text-selection program, configuring the computing device to operate in a variable text-selection mode that allows the character string-level selection and the character-level selection.

11. A device comprising:
a memory; and
one or more programmable processors configured to:
output, for display, a plurality of characters;
receive an input indicative of a slide gesture across one or more regions of a presence-sensitive input device that are associated with a group of characters included in the plurality of characters;
determine, based at least in part on one or more of an origination point and a speed of movement associated with the slide gesture, whether the slide gesture represents a character string-level selection or a character-level selection from the group of characters, wherein the character string-level selection comprises a multi-character selection of a character string from the group of characters;
responsive to determining that the slide gesture represents the character string-level selection from the group of characters and determining that the input indicative of the slide gesture covers only a portion of at least one character string included in the group of characters, output for display, a graphical selection of the at least one character string, such that the at least one character string is visually differentiated from any of the plurality of characters not included in the group of characters, wherein the character string comprises two or more consecutive characters included in the group of characters, and wherein the at least one character string does not comprise any space characters; and
responsive to determining that the slide gesture represents the character-level selection from the group of characters, output for display and in single character increments, a graphical selection of at least one character included in the group of characters, such that the at least one character is visually differentiated from any of the plurality of characters not included in the group of characters; and
output, for display and in a preview area of a user interface (UT), one or more occluded characters of the plurality of characters,
wherein the plurality of characters is displayed at a display area of the UI,
wherein the computing device detects a user contact at a region of the presence-sensitive input device that is associated with the one or more occluded characters, and
wherein the preview area of the UI is different from the display area of the UI.

12. The device of claim 11, wherein the at least one character string is demarcated from remaining characters of the plurality of characters by one or more space characters.

13. The device of claim 11, wherein, to output the one or more occluded characters in the preview area of the UI at least in part by, the one or more programmable processors are configured to:
  output, for display in the preview area of the UI, at least one full line of characters of the plurality of characters.

14. The device of claim 11, wherein the one or more programmable processors are further configured to:
  detect, based at least in part on at least one of 1) a change in a direction of movement associated with the slide gesture and 2) a change in the speed of movement associated with the slide gesture, a change between the character string-level selection and the character-level selection.

15. The device of claim 11, wherein the one or more programmable processors are further configured to:
  output, for display in a user interface (UI), at least two selection handles, such that at least a first selection handle is positioned before the at least one character string or before the at least one character within the UI, and a second selection handle is positioned after the at least one character string or after the at least one selected character within the UI.

16. The device of claim 11, wherein the one or more programmable processors are further configured to:
  identify an active program that provides the computing device with the plurality of characters;
  determine whether the active program is classified as a variable text-selection program, the variable text-selection program providing at least one user interface (UI) element that enables the character string-level selection and the character-level selection; and
  responsive to determining that the identified active program is classified as a variable text-selection program, configure the computing device to operate in a variable text-selection mode, the variable text-selection mode enabling the character string-level selection and the character-level selection through the at least one UI element.

17. The device of claim 11, wherein the one or more programmable processors are further configured to:
  determine whether the plurality of characters is received at a text-editor portion of a user interface (UI) provided by a program executing at the computing device;
  determine whether the identified active program is classified as a variable text-selection program, the variable text-selection program providing at least one user interface (UI) element that enables the character string-level selection and the character-level selection; and
  responsive to determining that the active program is classified as a variable text-selection program, configure the computing device to operate in a variable text-selection mode that allows the character string-level selection and the character-level selection.

18. A computer-readable storage device encoded with instructions that, when executed, cause one or more programmable processors of a computing device to perform operations comprising:
  outputting, for display, a plurality of characters;
  receiving an input indicative of a slide gesture across one or more regions of a presence-sensitive input device that are associated with a group of characters included in the plurality of characters;
  determining, based at least in part on one or more of an origination point and a speed of movement associated with the slide gesture, whether the slide gesture represents a character string-level selection or a character-level selection from the group of characters, wherein the character string-level selection comprises a multi-character selection of a character string from the group of characters without incrementally selecting any individual characters included in the character string;
  responsive to determining that the slide gesture represents the character string-level selection from the group of characters and determining that the input indicative of the slide gesture covers only a portion of at least one character string included in the group of characters, outputting for display, a graphical selection of the at least one character string, the at least one character string being demarcated from remaining characters of the plurality of characters by one or more space characters, such that the at least one character string is visually differentiated from the remaining characters of the plurality of characters by one or more space characters that are not included in the group of characters, wherein the selected character string comprises two or more consecutive characters included in the group of characters, and wherein the character string does not comprise any space characters; and
  responsive to determining that the slide gesture represents the character-level selection from the group of characters, outputting for display and in single character increments, a graphical selection of at least one character included in the group of characters, such that the at least one character is visually differentiated from any of the plurality of characters not included in the group of characters; and
  outputting, for display and in a preview area of a user interface (UI), one or more occluded characters of the plurality of characters,
  wherein the plurality of characters is displayed at a display area of the UI,
  wherein the computing device detects a user contact at a region of the presence-sensitive input device that is associated with the one or more occluded characters, and
  wherein the preview area of the UI is different from the display area of the UI.

* * * * *